United States Patent Office 3,399,510
Patented Sept. 3, 1968

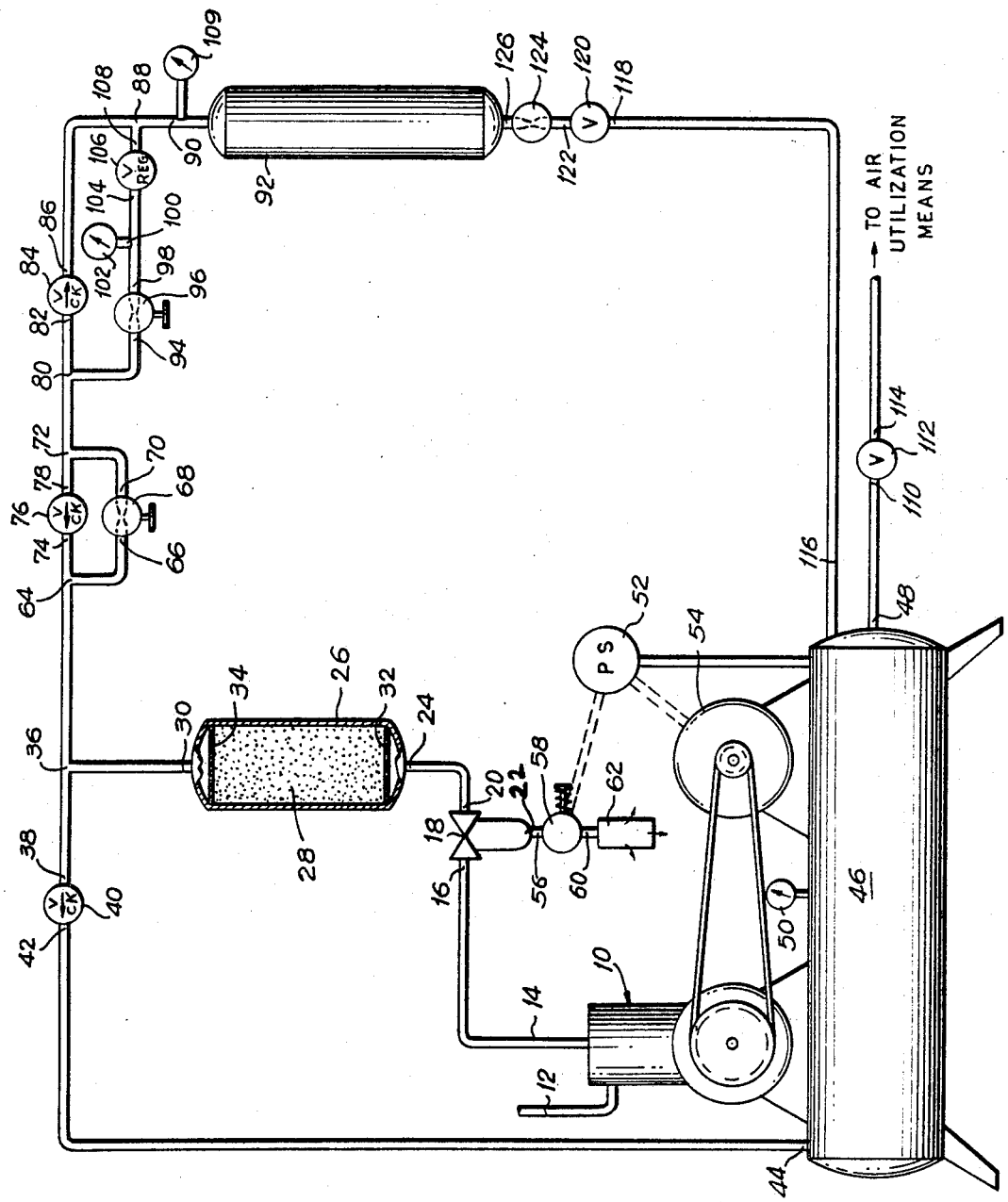

3,399,510
PROCESS AND APPARATUS FOR DE-
HYDRATING COMPRESSED GAS
George C. Kauer, Jr., Plainview, and Louis E. Brooks,
Great Neck, N.Y., assignors to Air Techniques, Inc.,
New Hyde Park, N.Y., a corporation of New York
Filed May 25, 1966, Ser. No. 552,846
11 Claims. (Cl. 55—33)

ABSTRACT OF THE DISCLOSURE

A system for compressing and dehydrating gas includes a compressor feeding at a given velocity a dehydrating chamber whose output is divided into two streams. One stream at full pressure is passed to a primary accumulator. The other stream, though a constriction, is passed to a secondary accumulator, and thus charges up to a pressure which is proportional to the duration of the interval that the compressor has run. In between intervals of operation of the compressor, the contents of the secondary accumulator may be expanded and passed at the given velocity back through the dehydrating chamber to dehydrate this chamber. Dry gas may be withdrawn from the primary accumulator while the compressor is operating.

---

This invention relates to the dehydration of compressed gas, and especially to a compressed gas dehydration system utilizing a desiccant, which desiccant is intermittently dehydrated.

Systems for compressing gas through a desiccant chamber into a storage tank and then on reaching a given maximum pressure intermittently turning off the compressor and bleeding back dry gas from the storage tank at reduced pressure through the desiccant chamber until a given minimum pressure is reached, at which occasion the cycle is repeated, are known. Such a system is shown, for example, In U.S. Patent No. 2,955,673. In such systems, a fixed volume of gas for the reflux or desorbing gas stream for purging the desiccant chamber is made available from the storage tank or an auxiliary tank in series with the storage tank. Irrespective of how much wet gas has been passed through the desiccant chamber, and, therefore, irrespective of how wet the desiccant is, only this fixed volume is available. Depending on the utilization of the dry gas, this fixed desorbing volume may be more than adequate or entirely inadequate to dehydrate the desiccant to the desired degree of dryness. In fact, the starting dryness of the desiccant will vary from cycle to cycle.

Therefore, it is the primary object of this invention to provide a secondary volume of dry gas for desorbing the desiccant which is responsive to the primary volume of wet gas which was previously passed through the desiccant.

Another object of this invention is to provide the secondary volume at a substantially constant velocity through the desiccant chamber during substantially the entire desorption cycle.

Another object of this invention is to provide a simple means of establishing the dryness of the desiccant.

A feature of this invention is the provision of a purge tank for the accumulation of dry, compressed gas for subsequent use as the secondary volume of gas for desorbing the desiccant which is fed in parallel to and concurrently with the primary tank.

These and other objects, features and advantages of this invention will be apparent upon consideration of the following specification taken in conjunction with the accompanying drawing in which The figure is a schematic diagram of a preferred embodiment of this invention.

A compressor 10 has an inlet 12 and an outlet 14. The outlet 14 is coupled to the wet gas inlet 16 of a separator 18, which separates drops of liquid from the gas. Said separator has a gas outlet 20 and a liquid outlet 22. The outlet 20 is coupled to a normal inlet 24 of a drying chamber 26 which contains a suitable desiccant 28 and has a normal outlet 30. The desiccant may be supported between two screens 32 and 34. The choice of desiccant material will be determined by the particular vapors to be removed from the primary gas stream provided by the compressor. Suitable known desiccants include, among others, silica gel, activated alumina, sor beads, and molecular sieves. The outlet 30 is coupled to one leg of a three-legged junction 36. A second leg of the junction is coupled to the inlet 38 of a check valve 40 which has an outlet 42. The outlet 42 is coupled to the inlet 44 of the primary accumulator or reservoir tank 46, which has an outlet 48. A pressure indicator 50 may be coupled to the primary tank 46. A pressure sensitive electrical switch 52 is coupled to the primary reservoir tank 46. The switch is adapted to open at a predetermined maximum pressure in said tank and to close at a predetermined minimum pressure therein. An electric motor 54 is coupled, as by pulleys and a belt, to the compressor 10 for driving the compressor, and is energized by an electrical source, not shown, which is controlled by the switch 52. The liquid outlet 22 of the separator 18 is coupled to the inlet 56 of a solenoid operated valve 58, which has an outlet 60 coupled to a muffler 62. The solenoid operated valve 58 is energized by an electrical source, not shown, which is controlled by the switch 52. The valve 58 is opened when the motor 54 is de-energized, and is closed when the motor is de-energized.

The third leg of the junction 36 is coupled to one leg of a junction 64. The second leg of the junction 64 is coupled to the inlet 66 of a variable orifice 68 which has an outlet 70 which is coupled to one leg of a junction 72. The third leg of the junction 64 is coupled to the inlet 74 of a check valve 76 which has an outlet 78 which is coupled to the second leg of the junction 72. The third leg of the junction 72 is coupled to one leg of a junction which has a second leg which is coupled to the inlet 82 of a check valve 84 which has an outlet 86. The outlet 86 is coupled to one leg of a junction 88 which has a second leg which is coupled to the normal inlet 90 of a secondary accumulator or reactivation purge volume tank 92. The third leg of the junction 80 is coupled to an inlet 94 of a variable orifice 96 which has an outlet 98. The outlet 98 is coupled to one leg of a junction 100 which has a second leg coupled to a pressure indicator 102. The third leg of the junction 100 is coupled to the outlet 104 of a pressure regulation valve 106 which has an inlet 108 coupled to the third leg of the junction 88.

The outlet 48 of the primary tank 46 is coupled to the inlet 110 of a valve 112 which has an outlet 114 coupled to the compressed air utilization means, not shown.

The primary tank 46 has an additional outlet 116 which is coupled to the inlet 118 of a valve 120 which has an outlet 122. The outlet 122 is coupled by way of a fixed orifice 124 to an auxiliary inlet 126 of the secondary accumulator or reactivation purge volume tank 92.

It will be appreciated that a desiccant is highly porous and that these pores will establish an equilibrium condition with the vapor pressure of a gas surrounding them. A desiccant will adsorb vapor from the gas surrounding it if the vapor pressure in its pores is lower than the partial pressure of the gas surrounding it, and in doing so will release heat. A desiccant will desorb vapor to the gas surrounding it if the vapor pressure in its pores is higher than the partial pressure of the gas surrounding it, and in doing so will absorb heat. The amount of water vapor which a volume of gas can hold is substantially constant, and not responsive to the pressure of the gas. Thus, if the heat of adsorption is not lost from the desiccant and if the volume of dry gas which passed through the desiccant during a desorption cycle is identical to the volume of wet gas which was passed through the desiccant during the preceding adsorption cycle, although the pressure may differ, and the velocities of these volumes are identical, substantially the same quantity of water vapor will be desorbed as was adsorbed.

The system is energized through the pressure sensitive electrical switch 52, which has contacts which are closed, for example, below 80 p.s.i.g., and are opened, for example, above 100 p.s.i.g. The pressure settings are established to conform to the end use requirements. The solenoid operated valve 58 and the electric motor 84 are wired in parallel. When the solenoid is energized the valve is closed, when the motor is energized the valve is closed, as when the motor is energized it drives the compressor 10. The compressor takes in ambient air through its inlet 12, and passes it as a primary air stream through the separator 18 and the drying chamber 26. The separator 18 removes and retains any free water or oil from the primary air stream, and the desiccant in the drying chamber adsorbs water vapor from this primary air stream. A major portion of this primary air stream further flows through the junction 36 and the check valve 40 into the primary tank 46. A minor potrion of this primary air stream flows from the junction 36 through the variable orifice 68 at a relatively reduced volumetric rate of flow and through the check valve 84 into the secondary accumulator or reactivation purge volume tank 92. The valve 120 is closed, and this minor portion of the primary air stream is accumulated in said tank 92. The air pressure builds up in the primary tank 46 as fast as the compressor delivers it, the air pressure builds up secondary accumulator or reactivation purge volume tank 92 at a relatively slower rate due to the restriction in flow provided by the variable orifice 68.

After the compressor starts at the minimum pressure, e.g., 80 p.s.i.g., it pumps up the pressure in the primary tank to the maximum pressure, e.g., 100 p.s.i.g. If no air is being drawn off through the valve 112 by the utilization device, the compressor will run some certain interval of time, depending on its volumetric capacity and the volume of the primary tank 46. During this certain interval of time, a certain volume of air of the primary stream will pass through the desiccant of the drying chamber. The variable orifice 68 is adjusted so that the volume of air that is accumulated during this certain interval of time, when subsequently expanded as a reflux stream through the variable orifice 96 as will be hereinafter explained, will be substantially equal to said certain volume of air of the primary stream through the desiccant, albeit at a lower pressure.

If compressed air is being drawn from the primary tank by the utilizing device through the valve 112 during the interval that the compressor is pumping up the primary tank to the maximum pressure, this pump-up interval will be longer than the before mentioned certain interval, and the volume of air of the primary stream passed through the desiccant of the drying stream will be correspondingly greater. However, the pressure of the accumulated gas in the reactivation purge volume tank 92 will be correspondingly higher, and the volume of gas when expanded as a reflux stream will be correspondingly greater. By the proper sizing of tank 92 and adjustment of the variable orifice 68, the gas volume of the reflux stream will be made substantially identical to the gas volume of the primary stream, for any pump-up interval, within the limits of the capacity of the reactivation purge volume tank, and is a linear function of the running time or pump-up interval of the compressor.

When the pressure in the primary tank 46 reaches the maximum, e.g., 100 p.s.i.g., the pressure senistive switch opens its contacts, stopping the motor 54, and opening the solenoid operated valve 58. The air in the drying chamber 26 vents to the atmosphere through the separator 18, the valve 58 and the muffler 62, carrying along any water or oil collected in the separator 18. The pressure in the drying chamber quickly drops to zero p.s.i.g. Air is blocked from flow out of the inlet 44 of the primary tank by the check valve 40. Air from the reactivation purge volume tank 92 flows back through the pressure regulation valve 106 which regulates the pressure at its outlet 104 to a low value, e.g., 5 p.s.i.g. The velocity of the air flow through the variable orifice 96 is constant because it has a regulated pressure, e.g., 5 p.s.i.g., upstream, and essentially atmospheric pressure downstream. This expanded dry air from the reactivation purge volume tank 92 flows as a reflux stream through the check valve 76, the desiccant in the drying chamber 26, the separator 18, the solenoid operated valve 58 nd the muffler 62 to the atmosphere. As this dry air passes through the desiccant it resorbs the water vapor therefrom and carries this water vapor along to the atmosphere.

The dryness of the gas of the primary stream leaving the drying chamber will depend upon the dryness of the desiccant contained in the drying chamber. To establish an initial level of dryness of the desiccant, the valve 120 is opened to provide a continuous supply of reflux dry air from the primary tank 46 to the reactivation purge volume tank for drying the desiccant. The fixed orifice 124 is so sized as to preclude overloading the compressor by making it run too often. A check is made on the dryness of the air going to the utilization device and when the desired degree of dryness is reached, the valve 120 is closed. With normal operation as previously described, the system will automatically maintain this degree of dryness in the air provided to the utilization device. Should unexpected overload conditions arise to decrease the dryness of this air, it can be reestablished by reopening the valve 120 until the desired degree of dryness is reestablished.

While we have shown and described the preferred embodiment of the invention, it will be understood that the invention may be embodied otherwise than as herein specifically illustrated or described, and that certain changes in the form and arrangement of parts and in the specific manner of practicing the invention may be made without departing from the underlying idea or principles of this invention within the scope of the appended claims.

What is claimed is:

1. A process of dehydrating gas comprising:
   compressing relatively wet gas from the atmosphere and passing the compressed gas as a primary stream at a relatively high pressure through a desiccant to adsorb water vapor from the primary stream;
   splitting said primary stream from said desiccant into a major portion stream and a minor portion stream;
   passing said major portion stream to a primary accumulator, and concurrently therewith passing said minor portion stream to a secondary accumulator to accumulate a quantity of dry gas in the secondary accumulator which is substantially proportional to the volume of the primary stream which is passed through the desiccant;
   halting said compressing operation upon reaching a predetermined gas pressure in the primary acumulator;
   expanding the accumulated dry gas from the secondary accumulator at a relatively low, constant pressure, and passing this expanded dry gas at a substantially constant velocity and at a volume of gas which is substantially equal to the volume of gas of the primary stream back through the desiccant as a reflux stream to desorb the adsorbed water vapor from the desiccant.

2. A process according to claim 1 wherein dry gas is withdrawn from the primary accumulator during the compressing operation, whereby the interval during which the compressing operation is conducted is extended and the concurrent interval during which said minor portion stream is passed to the secondary accumulator is identically extended.

3. A process according to claim 1 wherein the desiccant is initially brought to a desired degree of dryness by passing dry gas from said major portion stream alternatively back through the desiccant at the relatively low, constant pressure as a reflux stream.

4. A process according to claim 1 wherein the desiccant is initially brought to a desired degree of dryness by passing dry gas from the primary accumulator to the secondary accumulator and thence back through the desiccant at the relatively low, constant pressure as a reflux stream.

5. A process according to claim 1 wherein the desiccant is initially brought to a desired degree of dryness by passing dry gas from the primary accumulator to the secondary accumulator to augment the accumulation of dry gas therein.

6. Apparatus for dehydrating gas, which gas is provided by source means having an outlet for providing a primary gas stream at a relatively high pressure and at a predetermined volumetric rate of flow, said apparatus comprising:

a drying chamber containing a desiccant and having one end thereof for coupling to said outlet of said source means and the other end thereof coupled to a first leg of a first junction;

a primary accumulator having an inlet coupled via a first unidirectional flow control means to a second leg of said first junction, so that said first unidirectional flow control means permits flow only from said first junction to said primary accumulator;

a secondary accumulator having an inlet coupled via a secondary unidirectional flow control and flow restriction means to a third leg of said first junction, so that said second unidirectional flow control and flow restriction means permits flow only from said first junction to said secondary accumulator and at a pressure less than said high pressure;

first means, including a third unidirectional flow control means, coupled between said secondary accumulator and said other end of said drying chamber for passing gas from said secondary accumulator at a relatively low pressure to said drying chamber;

second means coupled to said one end of said drying chamber for providing a passageway from said one end to the atmosphere; and control means for coupling to said source means and coupled to said second means and responsive to the gas pressure in said primary accumulator, for causing said source means to provide said gas and for causing said second means to close said passageway from said one end of said drying chamber to the atmosphere when said gas pressure falls to a predetermined minimum, and for causing said source means to cease to provide said gas and for causing said second means to open said passageway from said one end of said drying chamber to the atmosphere when said gas pressure rises to a predetermined maximum.

7. Apparatus according to claim 6 further including said source means, which source means comprises a gas compressor.

8. Apparatus according to claim 6 wherein said first unidirectional means includes a first check valve; and
said second unidirectional flow control and flow retriction means includes a second check valve and a flow constriction in series.

9. Apparatus according to claim 6 wherein said means for passing gas from said secondary accumulator to said drying chamber includes a pressure regulation valve, a flow constriction, and a third check valve in series.

10. Apparatus according to claim 6 further including additional means coupled between said primary accumulator and said secondary accumulator for passing gas from said primary accumulator to said secondary accumulator and thence through said first means for transmitting gas from said primary accumulator to said other end of said drying chamber when said passageway to the atmosphere is open.

11. Apparatus according to claim 10 wherein said additional means includes a valved conduit between said primary and secondary accumulators.

References Cited

UNITED STATES PATENTS

| 2,944,627 | 7/1960 | Skarstrom | 55—33 |
| 3,182,435 | 5/1965 | Axt | 55—33 X |
| 3,192,686 | 7/1965 | Berkey et al. | 55—33 X |

REUBEN FRIEDMAN, *Primary Examiner.*